B. P. CRANDALL, Jr.
Vehicle Spring.
No. 104,277.  Patented June 14, 1870.
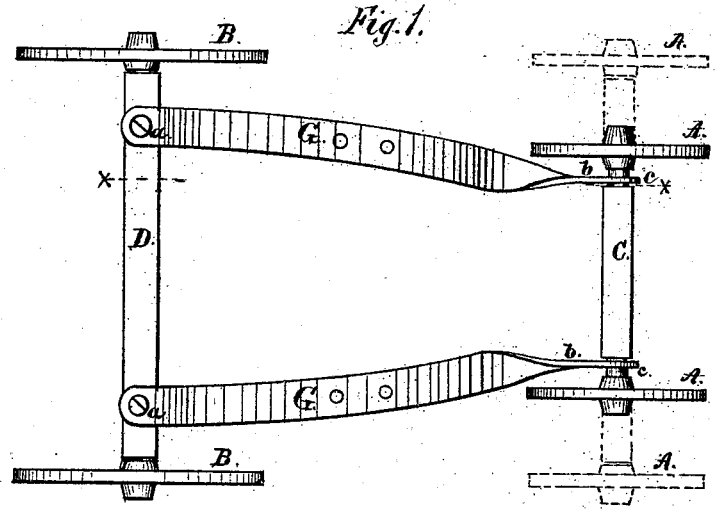
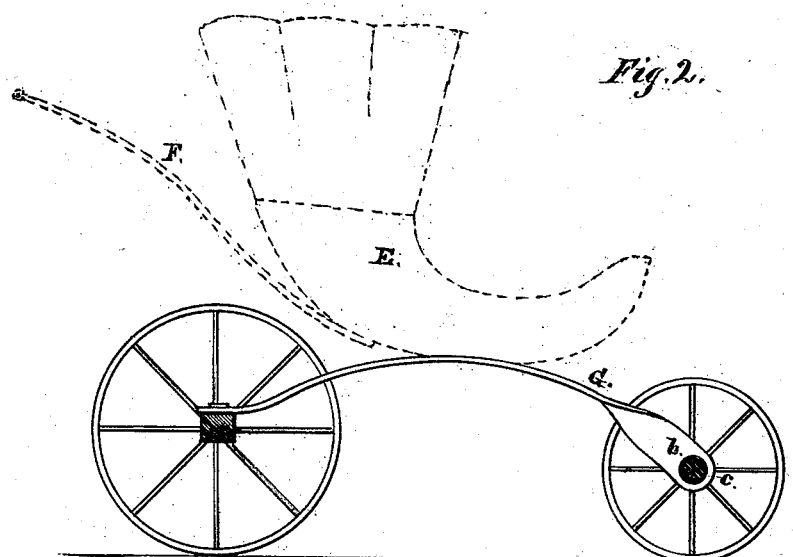

United States Patent Office.

BENJAMIN P. CRANDALL, JR., OF WILLIAMSBURG, NEW YORK.

Letters Patent No. 104,277, dated June 14, 1870.

IMPROVEMENT IN SPRINGS FOR VEHICLES.

The Schedule referred to in these Letters Patent and making part of the same.

*To all whom it may concern:*

Be it known that I, BENJAMIN P. CRANDALL, Jr., of Williamsburg, in the county of Kings and State of New York, have invented a new and useful Improvement in Carriages; and I do hereby declare the following is a full, clear, and exact description of the construction and operation of the same, reference being had to the annexed drawing forming part of this specification, in which drawing—

Figure 1 is a top or plan view of my improved springs as attached to the front and rear axles of a carriage.

Figure 2 is a side view of the same as applied to a child's carriage or perambulator.

Nature and Object of Invention.

This invention relates to carriages or other land conveyances, and consists in the peculiar and novel construction of the springs, whereby the front and rear axles are connected together. Also, allowing the free oscillation of the front or rear wheels on coming in contact with ruts, stones, or other slight obstructions, thus somewhat preventing the sudden jar to which vehicles are subjected, all of which will hereinafter be described.

Like letters of reference indicate corresponding parts.

A, in the drawing, may represent the front, and

B the hind or rear wheels.

C the front, and

D the rear axle.

E is the body of a carriage, with its handles, F, whilst G G are springs, supporting the body, and which connect together the respective axles.

In fig. 1 is shown a child's carriage or perambulator, in which H is the top, and E the body, carrying a pushing or pulling-handle, which body is mounted and secured upon side springs, hereinafter mentioned.

G G are the side springs, connecting together the axles, and are made of a curvilinear form, more or less their entire length, their edges being, respectively, of a crown and arched formation, having an eye, $a$, at one end, for the passage of a screw or bolt, to screw it to the rear axles, while, at or near its other end, it is provided with a twist or bend, $b$, and an eye, $c$, so as to be placed upon the journal of the axle, next to its shoulder, and retained upon the same by the hub of the wheel, as clearly shown in figs. 1 and 2.

The peculiar twist or bend given to these springs is in order that the sides of the same will clear the hub of the wheel, and not interfere with the free rotation of the same, whether placed upon the journal, on the inside or outside of the hub.

In fig. 1, the front axle of the carriage is shown of a length much less than that of the rear axle, so that, by the peculiar twist and bend given to the springs, the front wheels are brought within a line drawn forward, either from the hind wheels or body of the carriage.

These springs are made, preferably, of spring-steel, but may be made of wood, or other suitable material, and provided with one plate, or more, if desired, for use on carriages for transporting heavy loads, and, owing to their elasticity and location, the front or rear wheels, with their axles, are allowed to oscillate and arrest, to a considerable degree, the jarring, caused by the said wheels coming in contact with ruts, stones, or other slight obstructions.

In fig. 1 the dotted lines illustrate the springs, as applied to the journals of axles of carriages or wagons, when the front and rear axles are of equal length.

These springs are shown as having but one twist, as at $b$, and as being secured to the journal of the axle on the inside of the hub. To such I do not limit myself, as the same may be formed with a twist at both ends, corresponding to that designated by the letter $c$, and may readily be applied to the journals on the outside of the hub, as well as on the inside, and produce the same result.

The body of the carriage may be secured upon side sills or springs, and the same then secured to the springs G G.

It will thus be seen that I have constructed a neat and substantial spring, dispensing, to some extent, with the use of clips and bolts, and which can readily be applied to carriages of every description.

Having thus described my invention,

What I claim as new, and desire to secure by Letters Patent, is—

1. The spring G, formed with a twist, $b$, an eye, $c$, substantially as herein shown and described, for the purpose set forth.

2. The springs G G, constructed as herein shown and described, supporting the body of a vehicle, and supported upon the journals of the axles, whose bearings they form, substantially as described, for the purpose set forth.

The above signed by me this 5th day of May, 1870.

BENJ. P. CRANDALL, JR.

Witnesses:
W. E. CRANDALL,
THOMAS A. STINSON.